S. F. RITTER.
CASH CONTROL APPARATUS.
APPLICATION FILED MAY 3, 1918.

1,306,973.

Patented June 17, 1919.
2 SHEETS—SHEET 1.

Inventor
Sophus Frederik Ritter,
By Henry M— Jr
Atty.

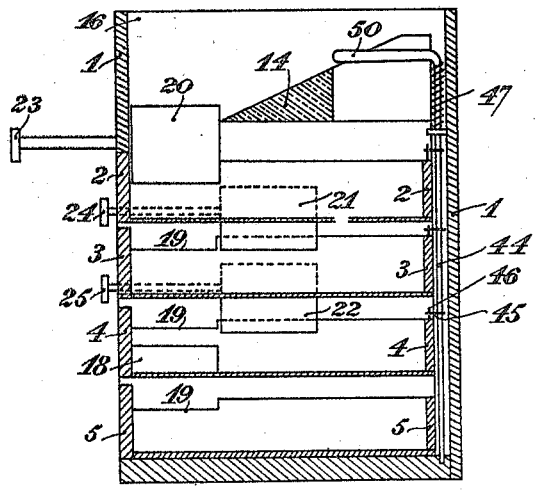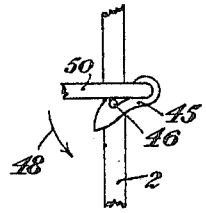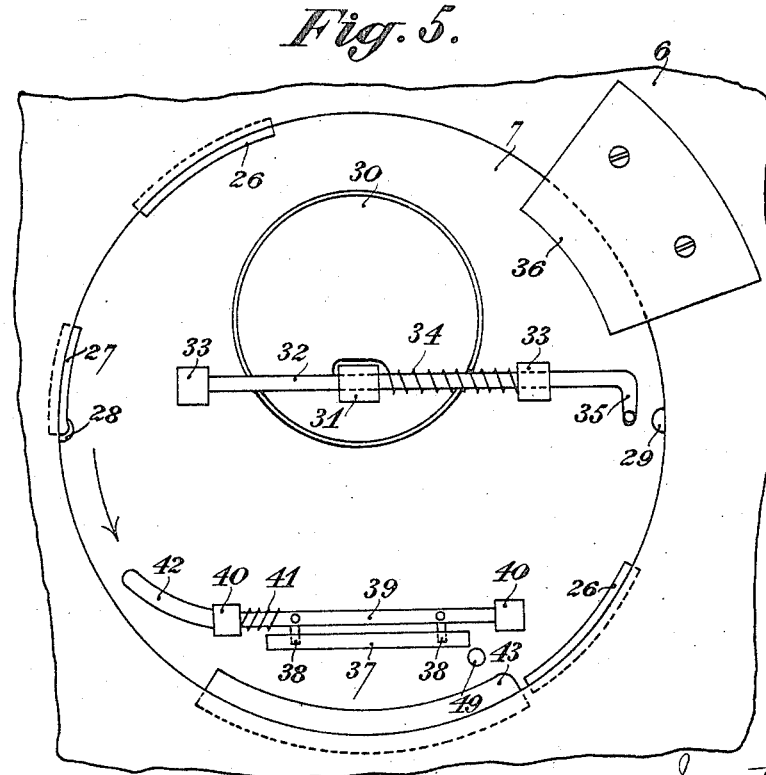

UNITED STATES PATENT OFFICE.

SOPHUS FREDERIK RITTER, OF COPENHAGEN, DENMARK, ASSIGNOR TO FREDERIK OSCAR BLOCH, OF COPENHAGEN, DENMARK.

CASH-CONTROL APPARATUS.

1,306,973.      Specification of Letters Patent.      Patented June 17, 1919.

Application filed May 3, 1918. Serial No. 232,265.

*To all whom it may concern:*

Be it known that I, SOPHUS FREDERIK RITTER, a subject of the King of Denmark, residing at Copenhagen, in the Kingdom of Denmark, have invented certain new and useful Improvements in Cash-Control Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Cash control apparatus are already known in which the coins paid in and the control checks for the amount paid in are indicated in the members in which the money and checks are respectively thrown into before they are caused to fall down into the control-apparatus by means of the action of said members. This kind of apparatus makes it possible for the person in charge to verify, among other things, that the amount paid in corresponds with the control checks, but if any disagreement occurs, it is not possible to ascertain which employee in business is in fault.

The object of the present invention is to facilitate a perfect control of every individual employee, each being allotted a special money-drawer, to which the amount paid in by him for what he sells is conducted from the indicating-members after they are actuated for delivery of the amount and control-check, the latter being conducted to a compartment in common for all employees, which is accessible only for the person in charge. The conducting to the employee's special drawer from the common indicating-member for money is accomplished by the adjustment either of one distributing-member, in common for all drawers, or of several such members, one for each drawer.

Figure 1:
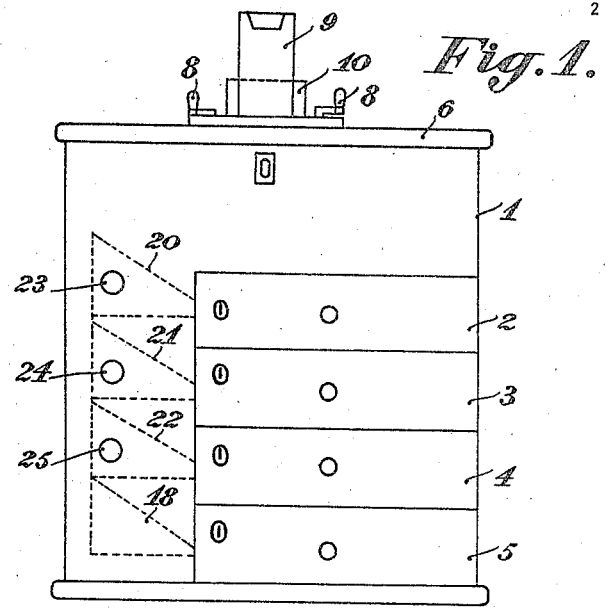
Figure 2:
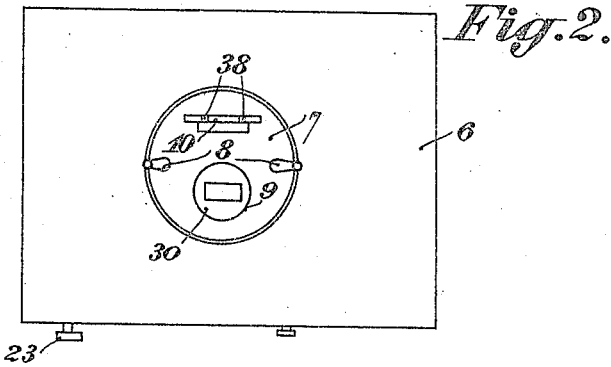
Figure 3:
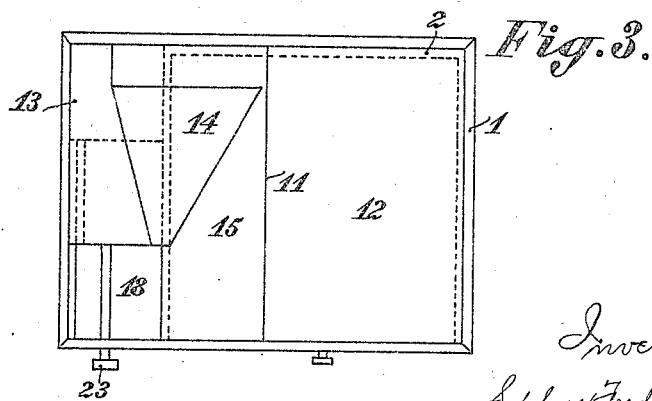

One form of construction of this invention is shown in the drawing, in which Figure 1 is a front view of the cash-control apparatus, Fig. 2 a top view of the same, Fig. 3 is a top-view of the same with the lid removed, Fig. 4 is a vertical section, Fig. 5 is the central part of the lid seen from below, and Fig. 6 shows details.

The cash-control apparatus consists of a box 1 with three employee money drawers 2, 3, and 4, and a drawer 5 for change. The top of the box is covered with a hinged lid 6, in the middle of which there is a circular opening, in which is disposed a plate 7 turnable by means of lugs 8. Instead of by means of lugs 8 the plate 7 may be turned mechanically, *i. e.* by means of a crank on the side of the box and a suitable cog-wheel gear. On the plate 7 there are disposed receiving members 9 and 10 for money and for control checks respectively.

In the top of the box 1 there is, just under the lid, a chamber divided by a partition 11, so that there is formed a chamber 12, into which the control checks fall down from the member 10 when the plate 7 is turned, while the money from the member 9 falls down on the other side of the wall 11, where, by means of inclined planes 13, 14, and 15, there is formed a trough, which leads down to a shaft 16, which runs vertically down through the entire apparatus and at its bottom is closed by an inclined plane 18, which leads into a recess 19 in the adjacent side-wall of the change-drawer 5. A corresponding recess 19 is found in the three employee money-drawers 2, 3, and 4 (see Fig. 4).

Under the inclined plates 13, 14, and 15 there are normally three vertical inclined planes 20, 21, and 22; disposed the one above the other, which, by means of pulling-members, 23, 24, and 25, respectively, can be displaced horizontally, so that they may be carried out into the shaft 16, as shown, with respect to the inclined plane 20, in Fig. 4. When the inclined plane 20 is in the latter position, it catches the coins sliding down from the inclined planes 13, 14, and 15, and conducts them through the recess 19 into the drawer 2. In a corresponding manner the coins may be conducted down into the drawers 3 or 4, by the adjustment of the inclined planes 21 or 22.

The plate 7 is held in the opening in the lid 6 by means of guide-rails 26 (Fig. 5) and is stopped, after each turn, at 180° by means of a spring catch 27, whose spherical head falls into one of the two recesses 28 and 29 in the lower side of the plate 7. In the plate, under the receiving-member 9, there in an opening covered by a plate 30, which, by means of a socket 31, is secured to an axle 32, which runs in bearings 33 and is actuated by a spiral spring 34 disposed around it, one end of the spring being secured to the axle and the other to one of the bearings 33, so that the spring tends to hold the plate 30 up in the hole in the plate 7. The axle 32 has, at one end, a somewhat downward-bent arm 35 which, when the plate 7 is turned in the direction indicated by the arrow in Fig. 5, is carried in under the projecting edge of a plate 36 secured to the lid 6. Thereby the arm 35 is pressed in against the plate 7, so that the axle 32, and also the plate 30, is turned, after which the coins resting on the plate 30 slide down the plate on to the inclined planes 13, 14, and 15, from which they slide down into the shaft 16, and either meet the inclined plane 18, so that they slide into the change-drawer, or one of the previously adjusted inclined planes 20, 21, and 22, when they are carried into the corresponding one of the drawers 2, 3, and 4.

The receiving-member 10 for the control-checks opens out into a slit 37 in the plate 7. In this slit two stop-pins 38 mesh thus holding the control-check in place in the member 10. Outside the slit 37 the pins 38 are bent at a right angle and secured to an axle 39 journaled in bearings 40, said axle 39 being actuated by a spiral spring 41 disposed around it, so that the pins normally mesh into the slit 37. The axle 39 has an arm 42 bent down toward the plate 7, which arm 42, when the plate is turned, slides up on to a rail 43 secured to the lid, whereby the axle is turned so that the pins 38 are carried out of the slit 37, and the control-check slides through the slit down into the chamber 12. The rail 43 also serves as guide-rail for the plate 7.

When the money is paid into the member 9, and the control-check is placed in the member 10, the plate 7 is turned so that the member 10 is turned out toward the buyer, and at the next turn of the plate, the movement of the axles 32 and 39 takes place. In the position where the member 10 is turned toward the employee, and therefore the check eventually put in is not visible to the customer, the employee's drawer ought not to be openable, which, according to Figs. 4, and 6, is accomplished by means of a locking-bar 44, with hooks 45, disposed behind the drawers, which locking-bar can catch a pin 46 on the rear edge of each drawer, said bar 44 being actuated by a spring 47 to turn in the direction indicated by the arrow 48 shown in Fig. 6. When the plate 7 is turned so that the member 10 is turned toward the customer, the bar 44 is turned in the direction of the aforesaid arrow by a pin 49, Fig. 5, engaging the bent end 50 of the bar 44, whereby the pins 46 are liberated from the hooks, and the drawers can be opened.

It is evident that both the distributing members, by means of which the coins are brought down into the respective drawers, and the indicating members may be altered in many ways included in the principles of the invention, which only claims such a collaboration between the various parts that the coins, after being thrown in and shown, are conducted down into the previously determined money-drawer, while the control-checks are conducted down into a common compartment.

I claim—

1. An apparatus of the character described, comprising a receptacle, a money receiver and a check receiver thereon adapted to communicate therewith, a check compartment and a plurality of money compartments in the receptacle, means to conduct checks from the receiver to the check compartment, a shaft in the receptacle common to all the money compartments, means to conduct money from the receiver to the shaft, and a plurality of inclined planes adapted to selectively connect any one of the money compartments with the shaft.

2. An apparatus of the character described, comprising a receptacle, a check compartment and a money compartment therein, a money receiver and a check receiver on the receptacle normally out of communication therewith, means operated by the movement of the receiver to establish communication between the receptacle and receiver, and means to conduct money and means for conducting checks from the latter to the respective compartments.

3. An apparatus of the character described, comprising a receptacle, a check compartment therein, a plurality of money drawers in the receptacle, a shaft in the latter common to all the drawers, a money receiver and a check receiver adapted to communicate with said compartment and shaft, and a plurality of horizontally movable inclined planes arranged to connect the shaft with any one of the money drawers.

4. An apparatus of the character described, comprising a receptacle, a check compartment therein, a plurality of money drawers in the receptacle, a vertical shaft in the latter common to all the drawers, a money receiver and a check receiver adapted to communicate with said compartment and shaft, and horizontally displaceable inclined planes arranged to connect each drawer with the shaft.

5. An apparatus of the character described, comprising a receptacle having a check compartment and a vertical shaft therein, a plurality of money drawers communicating with the shaft through recesses in their sides, means to conduct money and means to conduct checks to the shaft and compartment respectively, and a horizontally displaceable slide for each drawer movable into the shaft opposite the recess.

6. An apparatus of the character described, comprising a receptacle, a plurality of movable money compartments and a check compartment in the receptacle, a money receiver and a check receiver mounted in the top of the receptacle and in communcation therewith, a rotatable plate carrying the receivers adapted to operatively position the latter with respect to the compartments, means on the plate to retain the money and checks in the receivers, means operated by the rotation of the plate to actuate the retaining means to release the money and checks from the receivers, means to lock the money compartments, and means operated by the movement of the plate to actuate the locking means to release the money compartments.

In testimony that I claim the foregoing as my invention, I have signed my name.

SOPHUS FREDERIK RITTER.

Copies of this patent may be obtained for five cents each, by addressing the "Commissioner of Patents, Washington, D. C."